(12) United States Patent
Kataoka

(10) Patent No.: US 9,050,853 B2
(45) Date of Patent: Jun. 9, 2015

(54) WHEEL FOR AUTOMOBILE

(75) Inventor: Naoto Kataoka, Aichi (JP)

(73) Assignee: CENTRAL MOTOR WHEEL CO., LTD., Aichi (JP)

( * ) Notice: Subject to any disclaimer, the term of this patent is extended or adjusted under 35 U.S.C. 154(b) by 283 days.

(21) Appl. No.: 13/640,003

(22) PCT Filed: May 21, 2010

(86) PCT No.: PCT/JP2010/058615
§ 371 (c)(1),
(2), (4) Date: Oct. 8, 2012

(87) PCT Pub. No.: WO2011/145209
PCT Pub. Date: Nov. 24, 2011

(65) Prior Publication Data
US 2013/0057049 A1    Mar. 7, 2013

(51) Int. Cl.
| B60B 3/04 | (2006.01) |
| B60B 3/00 | (2006.01) |
| B60B 3/12 | (2006.01) |

(52) U.S. Cl.
CPC . *B60B 3/007* (2013.01); *B60B 3/12* (2013.01); *B60B 2900/311* (2013.01); *B60Y 2200/11* (2013.01)

(58) Field of Classification Search
CPC ............ B60B 3/04; B60B 3/002; B60B 3/12; B60B 2900/311; B60B 3/007; B60Y 2200/11
USPC ........ 301/63.101, 63.103, 63.107; 29/894.32, 29/894.322, 894.323, 894.325
See application file for complete search history.

(56) References Cited

U.S. PATENT DOCUMENTS 2,818,303 A * 12/1957 Main et al. ............... 301/63.104
(Continued)

FOREIGN PATENT DOCUMENTS

| JP | 1-095903 A |   | 4/1989 |
| JP | 11129701 A | * | 5/1999 |
| JP | 2000-085303 A |   | 3/2000 |
| JP | 2001-180202 A |   | 7/2001 |

(Continued)

OTHER PUBLICATIONS

An International Search Report, mailed Aug. 10, 2010, which issued during the prosecution of International Application No. PCT/JP2010/058615, which corresponds to the present application.

*Primary Examiner* — Kip T Kotter
*Assistant Examiner* — Jean Charleston
(74) *Attorney, Agent, or Firm* — McDermott Will & Emery LLP

(57) ABSTRACT

A hat portion of a wheel disk includes a hat inner inclined circumferential portion and a hat outer inclined circumferential portion. At least one of the hat inner inclined circumferential portion and the hat outer inclined circumferential portion includes: a plurality of curved protruding circumferential portions that protrude toward a surface side into a curved shape; and at least one curved recessed circumferential portion that is provided between the adjacent curved protruding circumferential portions and that is recessed toward a back side into a curved shape. The hat portion of this construction provides a significant effect in improving stiffness because of the shapes of the curved protruding circumferential portions and the curved recessed circumferential portion. Consequently, an automobile wheel has improved overall stiffness and strength. Therefore, a car on which the automobile wheel is mounted can provide increased driving stability.

2 Claims, 8 Drawing Sheets

(56) References Cited

U.S. PATENT DOCUMENTS

| | | | |
|---|---|---|---|
| 2,840,422 A * | 6/1958 | Main et al. | 301/63.104 |
| 5,951,114 A * | 9/1999 | Marron et al. | 301/63.101 |
| 6,332,653 B1 * | 12/2001 | Shimizu et al. | 301/63.101 |
| 8,042,880 B2 * | 10/2011 | Kozaki et al. | 301/63.107 |

FOREIGN PATENT DOCUMENTS

| | | |
|---|---|---|
| JP | 2006-082733 A | 3/2006 |
| JP | 3770865 B2 | 4/2006 |
| JP | 2008-114723 A | 5/2008 |
| JP | 2010-076464 A | 4/2010 |

* cited by examiner

Fig.7

|  | Displacement $\delta$ | Weight | Displacement $\delta$ × Weight |
|---|---|---|---|
| Example 1 | 0.904 | 0.994 | 0.899 |
| Example 2 | 0.919 | 0.988 | 0.908 |
| Example 3 | 0.936 | 0.998 | 0.934 |
| Conventional Construction | 1 | 1 | 1 |

US 9,050,853 B2

WHEEL FOR AUTOMOBILE

CROSS REFERENCE TO PRIOR APPLICATIONS

This application is a U.S. National Phase application under U.S.C. §371 of International Application No. PCT/JP2010/058615, filed on May 21, 2010. The international Application was published in Japanese on Nov. 24, 2011 as WO2011/145209 A1 under PCT Article 21(2). All these application are herein incorporated by reference.

FIELD OF THE INVENTION

The present invention relates to an automobile wheel that includes a wheel disk connected to an axle and a wheel rim on which a tire is mounted, in which the wheel disk is engaged with an inner circumferential surface of the wheel rim to join the wheel disk and the wheel rim together.

BACKGROUND

As shown in FIG. 6 for example, a conventional automobile wheel a made of steel is typically of a two-piece construction and includes: a substantially disk-shaped wheel disk c; and a substantially cylindrical wheel rim b, in which the wheel disk c is engaged with an inner circumferential surface of the wheel rim b to be welded to the wheel rim b together into one piece (for example, Patent JP 2001-180202 A). The wheel disk c includes: a hub mounting portion f that is connected to a hub 102 of an axle 101; a hat portion h that bulges from an outer circumferential edge of the hub mounting portion f toward a surface side direction; and a disk flange d that extends from an outer circumferential edge of the hat portion h toward a back side direction. The hub mounting portion f, the hat portion h, and the disk flange d are arranged concentrically. The hat portion h includes: a hat top circumferential portion p that protrudes toward the surface side direction; and a hat inner inclined circumferential portion g that is continuously formed from the hat top circumferential portion p to the outer circumferential edge of the hub mounting portion f and that is formed circumferentially with one inner protruding portion k that protrudes toward a surface side. The hat portion h also includes a hat outer inclined circumferential portion q that is continuously formed from the hat top circumferential portion p to the disk flange d and that is formed circumferentially with one outer protruding portion m that protrudes toward the surface side into a curved shape.

The hat portion h of the wheel disk c provides desired stiffness. The hat portion h of the desired stiffness is very effective in minimizing deformation of the wheel disk c due to various loads that are imposed during car driving. Thus the automobile wheel a can have high overall strength. Particularly, under a lateral force loading on the car during driving, a bending moment acts on the wheel disk c. The bending moment is relatively large enough to bend the wheel disk c in a surface-side to back-side direction. The hat portion h provides high stiffness for the bending moment and minimizes the deformation of the wheel disk c. This allows the automobile wheel a to have high strength and to provide increased driving stability.

SUMMARY OF THE INVENTION

In recent years, there has been a strong demand for improving environmental performance of the car. Accordingly, requirements for characteristics of the automobile wheel, such as lighter weight and higher strength, are increasingly severe. This leads to a stronger demand for a further lighter and further stronger automobile wheel than the automobile wheel that has the conventional hat portion (see FIG. 6). In addition, as the car performance improves, there is a demand for further improving driving stability of the car when loaded with a lateral force.

The present invention proposes an automobile wheel that ha high strength and provides increased driving stability.

The present invention is directed to an automobile wheel that includes: a wheel disk; and a substantially cylindrical wheel rim on which a tire is mounted, in which the wheel disk includes: a substantially disk-shaped hub mounting portion that is connected to a hub of an axle; a hat portion that bulges outward from the hub mounting portion toward a surface side direction; and a disk flange that extends from an outer circumferential edge of the hat portion toward a back side direction, and the wheel disk is engaged with an inner circumferential surface of the wheel rim to join the wheel disk and the wheel rim together, in which the hat portion includes: a hat top circumferential portion that circumferentially protrudes toward the surface side direction into a curved shape; a hat inner inclined circumferential portion that is formed continuously from the hat top circumferential portion to an outer circumferential edge of the hub mounting portion; and a hat outer inclined circumferential portion that is formed continuously from the hat top circumferential portion to the disk flange, and at least one of the hat inner inclined circumferential portion and the hat outer inclined circumferential portion is formed circumferentially with: a plurality of curved protruding circumferential portions that circumferentially protrude toward a surface side into a curved shape; and at least one curved recessed circumferential portion that is provided between the adjacent curved protruding circumferential portions and that is circumferentially recessed toward a back side into a curved shape, the curved protruding circumferential portions and the curved recessed circumferential portion being arranged concentrically.

Preferably, the curved protruding circumferential portions and the curved recessed circumferential portion are formed smoothly continuously. At least one of the hat inner inclined circumferential portion and the hat outer inclined circumferential portion, which is constructed as described above, is formed into a wave shape in wavy patterns in vertical cross-section.

This construction can cause a relatively large height difference between the curved protruding circumferential portions and the curved recessed circumferential portion that is provided between the adjacent curved protruding circumferential portions, and therefore provides a significant effect in improving stiffness because of their shapes. The effect in improving stiffness, which is provided by the curved protruding circumferential portions of the invention, is much more significant than the effect in improving stiffness, which is produced by disposing only one curved protruding circumferential portion, for example. Therefore, in the construction of the invention, the hat portion has improved stiffness because of the shape of at least one of the hat inner inclined circumferential portion and the hat outer inclined circumferential portion, which is formed with the curved protruding circumferential portions and the curved recessed circumferential portion. Consequently, the wheel disk has improved overall stiffness and strength. Therefore, a car on which the automobile wheel is mounted provides improved driving stability under a lateral force loading on the car during driving.

The curved protruding circumferential portions and the curved recessed circumferential portion may have respective predetermined curved shapes as appropriate. When the curved shapes are predetermined based on a radius of curvature in vertical cross-section, for example, preferably the curved protruding circumferential portions all have the same radius of curvature. In addition, when a plurality of the curved recessed circumferential portions are provided, preferably the curved recessed circumferential portions all have the same radius of curvature. These preferable constructions help stabilize the balance in stiffness of the hat portion between the curved protruding circumferential portion and the curved recessed circumferential portion, and therefore help produce an effect in improving overall stiffness of the hat portion. More preferably, the curved protruding circumferential portions have a radius of curvature the same as the radius of curvature of the hat top circumferential portion. This helps further stabilize the balance in stiffness described above.

According to the automobile wheel described above, preferably the curved protruding circumferential portions that are provided on at least one of the hat inner inclined circumferential portion and the hat outer inclined circumferential portion of the hat portion are formed circumferentially at respective positions in a radial direction to be opposed to surface-side angular edges of a brake caliper mounted to a body.

The brake caliper has a three-dimensional shape to include therein a brake pad, and is disposed to protrude more toward the surface side than the brake disk secured to the axle. The brake caliper and the brake disk are located in an inner space of the automobile wheel connected to the axle. Therefore, in a typical automobile wheel, a hat portion of a wheel disk needs to have a predetermined shape and dimensions such that the hat portion does not come into contact with a brake caliper. This limits the shape or design of the hat portion.

In the construction described above, the curved protruding circumferential portions are provided at respective positions in the radial direction to be opposed to the surface-side angular edges of the brake caliper. Therefore, the curved protruding circumferential portions easily allow the hat portion to have a predetermined shape and dimensions such that it does not come into contact with the brake caliper. A gap between the hat portion and the brake caliper is thereby formed as small as possible. Accordingly, an overall area of the hat portion is reduced, and consequently the automobile wheel has a reduced overall weight. Particularly, the curved recessed circumferential portion that is provided between the adjacent curved protruding circumferential portions produces a greater functional effect in minimizing the gap between the hat portion and the brake caliper, and is also very effective in reducing the weight of the automobile wheel. Usually, weight reduction is achieved by trading-off improvements in stiffness and strength. However, the construction of the invention enhances both the effect in improving stiffness and strength and the effect in reducing weight.

The hat portion is formed circumferentially into the same cross-sectional shape. Therefore, the curved protruding circumferential portions are provided at respective positions in the radial direction to be opposed to the circumferentially-extending surface-side angular edges of the brake caliper. Preferably, the curved protruding circumferential portions are formed according to the number of the circumferentially-extending surface-side angular edges of the brake caliper. This construction can further enhance the above functional effect.

A proposal is made for the automobile wheel described above that each of the hat inner inclined circumferential portion and the hat outer inclined circumferential portion of the hat portion is formed circumferentially with: the plurality of the curved protruding circumferential portions; and the at least one curved recessed circumferential portion, the curved protruding circumferential portions and the curved recessed circumferential portion being arranged concentrically. This proposed construction further enhances the effect in improving stiffness of the hat portion, and further enhances the above functional effect of the invention.

EFFECT OF THE INVENTION

As described above, in the automobile wheel of the invention, the hat portion of the wheel disk, in which at least one of the hat inner inclined circumferential portion and the hat outer inclined circumferential portion includes: the plurality of the curved protruding circumferential portions that protrude toward the surface side into a curved shape; and the at least one curved recessed circumferential portion that is provided between the adjacent curved protruding circumferential portions and that is recessed toward the back side into a curved shape, provides a significant effect in improving stiffness because of the shapes of the curved protruding circumferential portions and the curved recessed circumferential portion. Consequently, the automobile wheel has improved overall stiffness and strength. Therefore, a car on which the automobile wheel of the invention is mounted can provide increased driving stability.

In the automobile wheel of the invention described above, the curved protruding circumferential portions are formed circumferentially at respective positions in the radial direction to be opposed to the surface-side angular edges of the brake caliper mounted to the body. This construction easily allows the hat portion to have a predetermined shape and dimensions such that it does not come into contact with the brake caliper. Therefore, the gap between the hat portion and the brake caliper is formed as small as possible to reduce an overall area of the hat portion. Consequently, the automobile wheel of the invention has a reduced overall weight. Therefore, the automobile wheel of the invention enhances both the effect in improving strength and stiffness and the effect in reducing weight.

In the automobile wheel of the invention described above, each of the hat inner inclined circumferential portion and the hat outer inclined circumferential portion of the hat portion is formed circumferentially with: the plurality of the curved protruding circumferential portions; and the at least one curved recessed circumferential portion, the curved protruding circumferential portions and the curved recessed circumferential portion being arranged concentrically. This construction further enhances the effect in improving stiffness of the hat portion, and further enhances the above functional effect of the invention.

BRIEF DESCRIPTION OF THE DRAWINGS

FIG. 6 is a vertical cross-sectional view of a conventional automobile wheel a;

FIG. 7 is a chart illustrating measurement results of displacement $\delta$ in a rotary bending fatigue test.

DETAILED DESCRIPTION OF THE INVENTION

Example 1

An automobile wheel 1 of Example 1 of the present invention will be described in detail with reference to the accompanying drawings.

Figure 1:
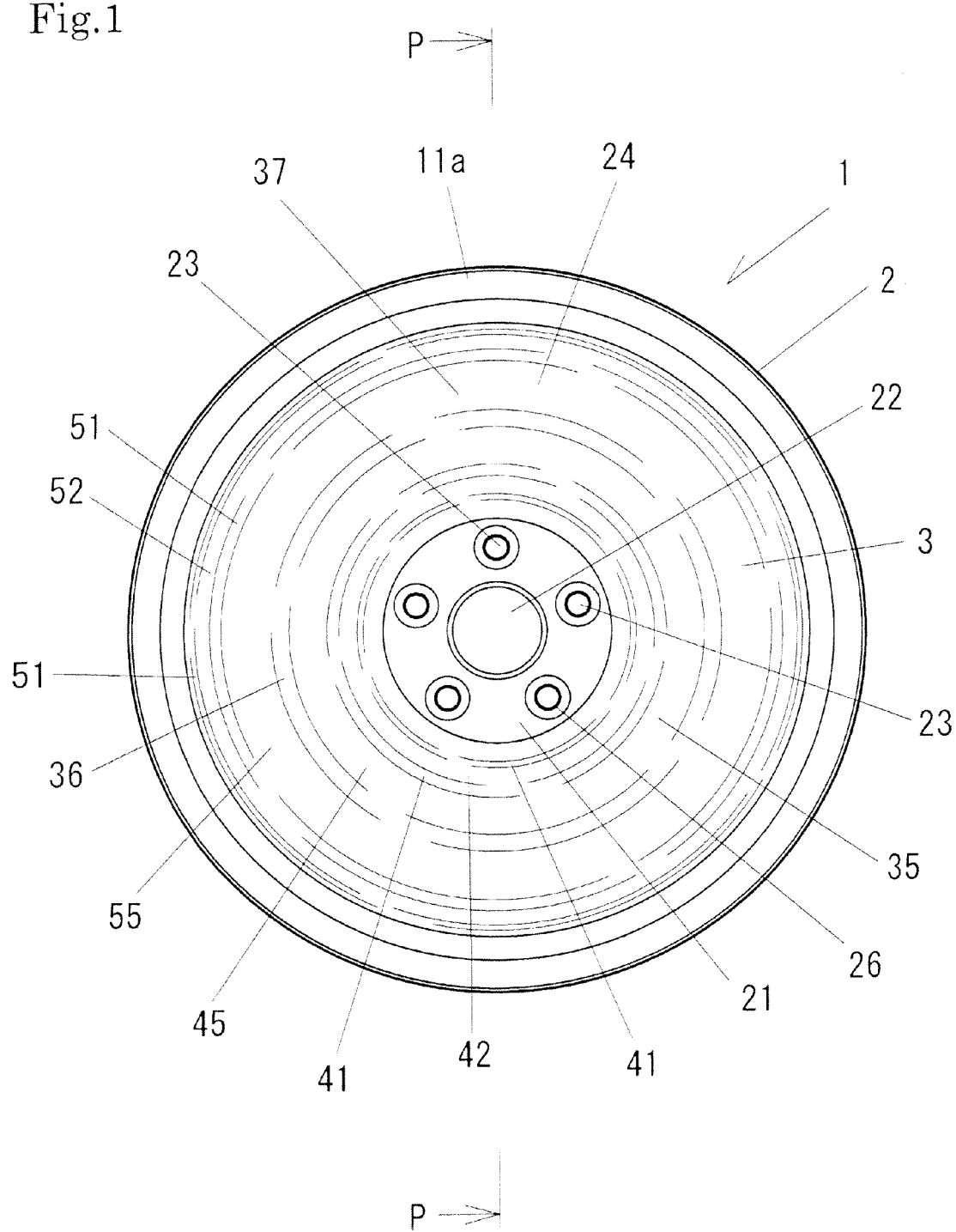
FIG. 1 is a plan view of an automobile wheel 1 of Example 1 of the present invention.
Figure 2:
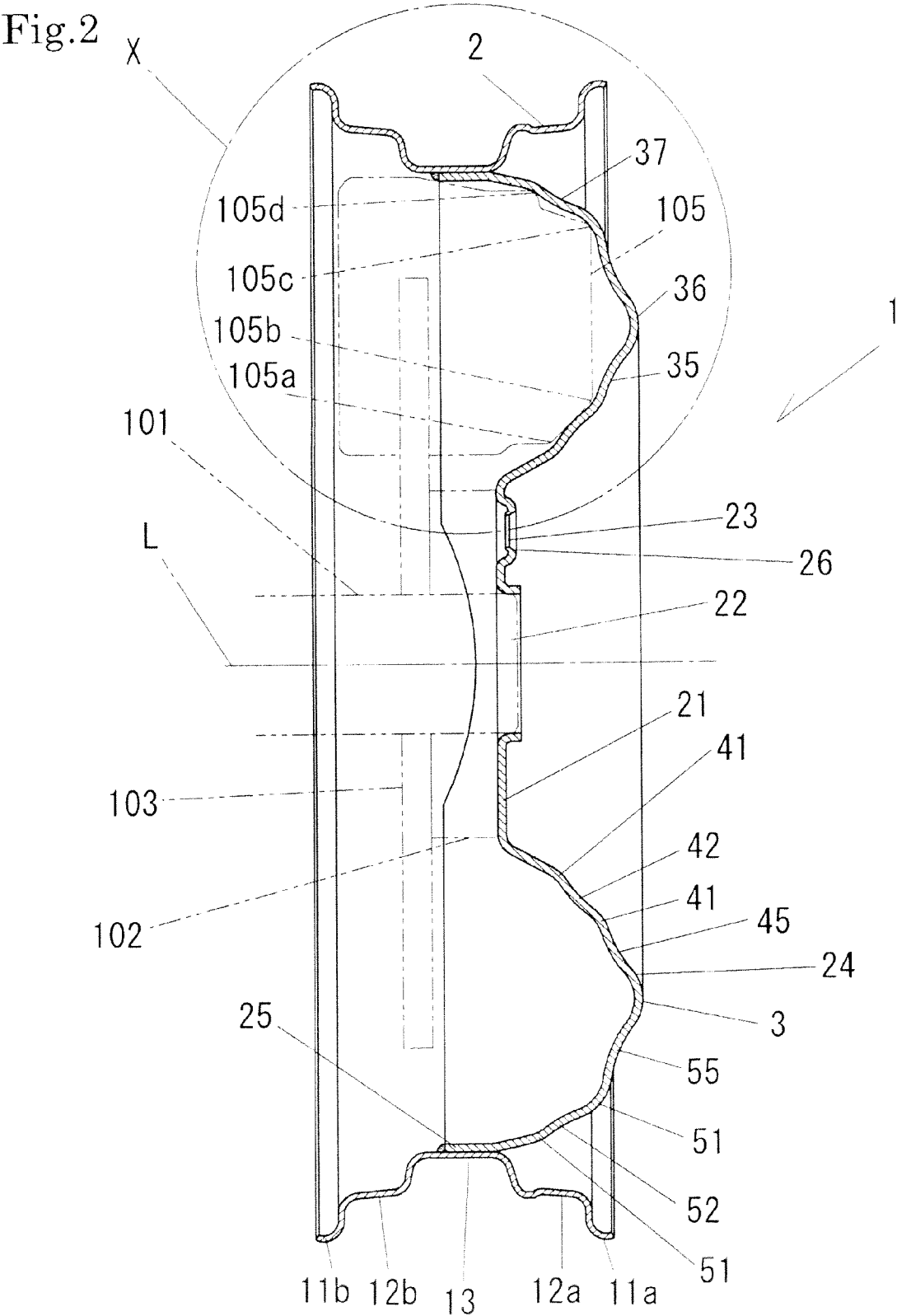
FIG. 2 is a vertical cross-sectional view taken along the line P-P in FIG. 1.
Figure 3:
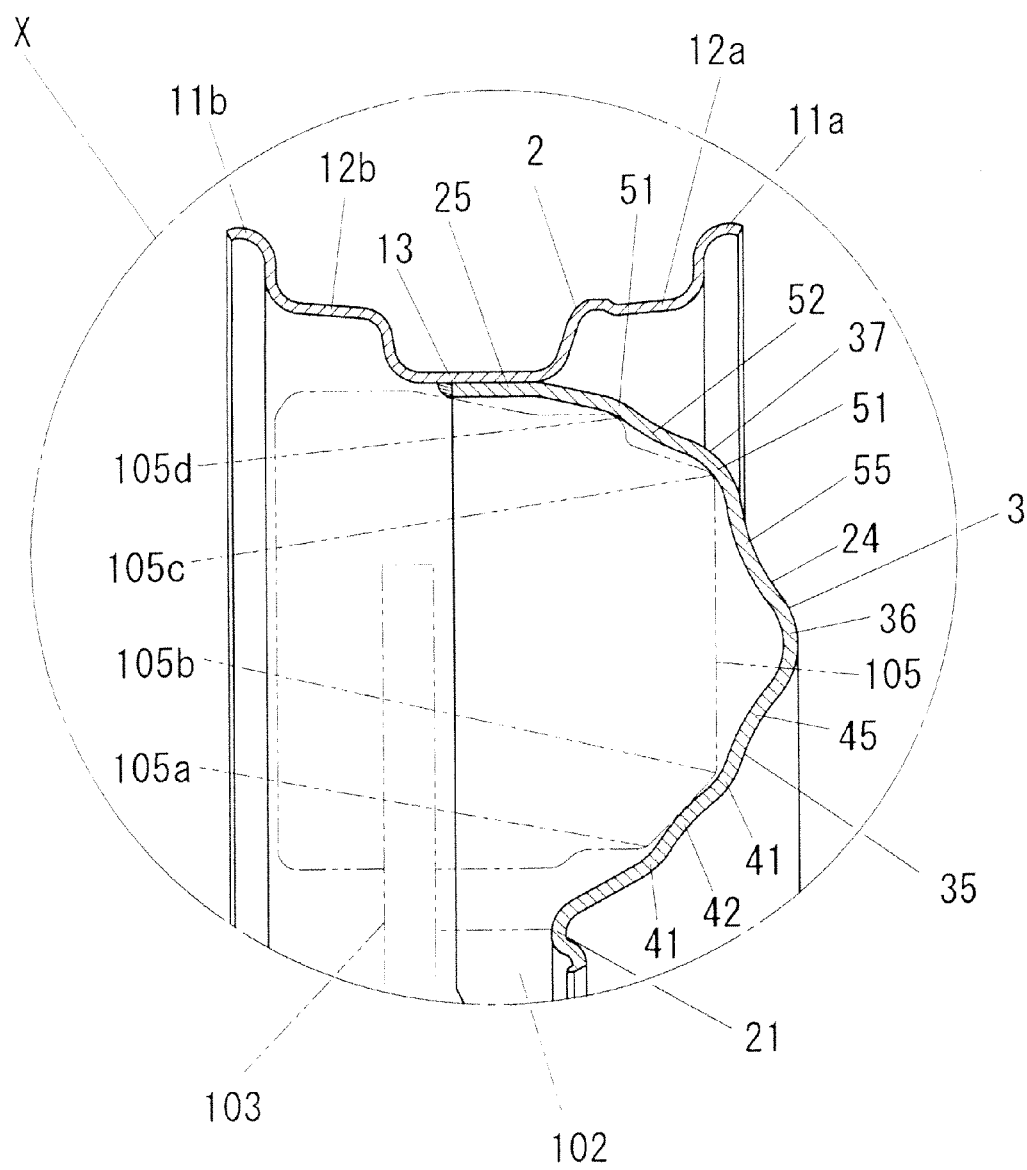
FIG. 3 is an enlarged vertical cross-sectional view of a part X in FIG. 2.

As shown in FIGS. 1 to 3, the automobile wheel 1 of the invention is a so-called drop-engaged automobile wheel that includes: a wheel rim 2 that includes a drop portion 13; and a wheel disk 3 that includes a disk flange 25. The disk flange 25 is engaged with an inner circumferential surface of the drop portion 13, and the disk flange 25 and the drop portion 13 are fillet welded together into one piece. Each of the wheel rim 2 and the wheel disk 3 is formed from a steel flat plate. The automobile wheel 1 of Example 1 of the invention is a two-piece steel wheel.

It should be noted in Example 1 of the invention that a direction toward an aesthetic surface side of the wheel disk 3 from its back surface side is designated as a surface side direction, while a direction opposite to the surface side direction is designated as a back side direction. Also, it should be noted that one radial direction of the automobile wheel 1 toward a central axis L of the automobile wheel 1 is designated as an inward direction, while the other radial direction opposite to the inward direction is designated as an outward direction.

The wheel rim 2 is shaped into a cylinder with different cross sections. The wheel rim 2 includes rim flanges 11a and 11b respectively on a surface-side opening edge and a back-side opening edge of the wheel rim 2. The rim flanges 11a and 11b support respective sidewalls of a tire (not shown). The rim flange 11a is formed continuously with a surface-side bead seat 12a, while the rim flange 11b is formed continuously with a back-side bead seat 12b. The surface-side bead seat 12a and the back-side bead seat 12b allow respective beads of the tire to be seated. The drop portion 13 is provided between the surface-side bead seat 12a and the back-side bead seat 12b and protrudes toward the inward direction. On mounting the tire, the bead of the tire is dropped into the drop portion 13, so that the tire is mounted on the wheel rim 2 easily.

The wheel rim 2 is formed from a rectangular steel flat plate of specific dimensions. More specifically, the rectangular steel flat plate is rolled with its shorter sides butting each other, and the shorter sides are butt-joined by upset butt welding to be formed into a straight cylinder body (not shown). The cylinder body is then subjected to rolling. In the rolling, specific inner and outer molds roll to press the cylinder body therebetween from the inside and the outside of the cylinder body, thereby to form the cylinder body into the wheel rim 2 of a desired shape. The wheel rim 2 is formed from the rectangular steel flat plate by a conventionally known method. Therefore, the conventionally known method is not described any further.

The wheel disk 3 is substantially disk-shaped and includes: a hub mounting portion 21; and a hat portion 24. The hub mounting portion 21 is substantially disk-shaped and has a center opening or a hub hole 22. The hat portion 24 is annular shaped and bulges from an outer circumferential edge of the hub mounting portion 21 toward the surface side direction. The wheel disk 3 also includes a disk flange 25. The disk flange 25 is annular shaped and extends from an outer circumferential edge of the hat portion 24 toward the back side direction. A plurality of bolt holes 23 are drilled through the hub mounting portion 21 at equal intervals circumferentially about the hub hole 22. Each of the bolt holes 23 has a nut seat 26. The hub mounting portion 21, the hat portion 24, and the disk flange 25 are arranged concentrically about the central axis L of the wheel disk 3.

The wheel disk 3 is formed by pressing a steel flat plate. More specifically, a substantially square steel flat plate is formed into a saucer-shaped plate that has a center circular recess, and the saucer-shaped plate is then subjected to drawing to form the hub mounting portion 21 and the hat portion 24, and is drilled to form the bolt holes 23 and so on. Additionally, the saucer-shaped plate is subjected to restriking to form the disk flange 25, thus to complete the forming of the wheel disk 3. These steps of forming the wheel disk 3 are performed in a conventional manner, and therefore the steps are not described any further.

The automobile wheel 1 in which the wheel rim 2 and the wheel disk 3 are welded together is joined to an axle 101 of a car after the tire (not shown) is mounted to the automobile wheel 1. As shown in FIG. 2, the axle 101 includes: a hub 102 that is brought into press-contact with a back surface of the hub mounting portion 21 of the wheel disk 3; and a disk-shaped brake disk 103. The hub 102 and the brake disk 103 are secured to the axle 101 and rotate together with the axle 101. A brake caliper 105 that applies a braking force to the brake disk 103 is disposed on a body side of the car.

A plurality of bolts (not shown) protrude from the hub 102 of the axle 101 and are inserted respectively through the bolt holes 23 of the hub mounting portion 21, and a nut (not shown) is screwed onto each of the bolts, so that the automobile wheel 1 is brought into press-contact with and secured to the hub 102. When the automobile wheel 1 is secured to the axle 101 as described above, the brake disk 103 and the brake caliper 105 are located in an inner space of the automobile wheel 1. Thus, the wheel disk 3 of the automobile wheel 1 has a predetermined shape and dimensions such that the wheel disk 3 does not come into contact with the brake caliper 105. The brake caliper 105 has a three-dimensional shape to include therein a brake pad that is brought into press-contact with the brake disk 103. In Example 1 of the invention, the brake caliper 105 extends substantially along the circumferential direction and has a specific three-dimensional shape. The brake caliper 105 is shaped to include surface-side angular edges 105a to 105d that extend substantially along the circumferential direction, two of which are provided on a radially outer side of the brake caliper 105, while the other two are provided on a radially inner side of the brake caliper 105.

A main part of the present invention is now described.

As shown in FIGS. 1 to 3, the hat portion 24 of the wheel disk 3 includes: an annular hat top circumferential portion 36; an annular hat inner inclined circumferential portion 35; and an annular hat outer inclined circumferential portion 37. The hat top circumferential portion 36 protrudes most toward the surface side direction. The hat inner inclined circumferential portion 35 is provided between the hat top circumferential portion 36 and the outer circumferential edge of the hub mounting portion 21. The hat outer inclined circumferential portion 37 is provided between the hat top circumferential portion 36 and the disk flange 25. The hat top circumferential portion 36, the disk flange 25, and the hub mounting portion 21 are formed concentrically about the central axis L.

In the construction of Example 1 of the invention, as shown in FIGS. 2 and 3, the hat inner inclined circumferential portion 35 of the hat portion 24 includes: two inner curved protruding circumferential portions 41, 41 that are circumferentially provided on an intermediate portion of the hat inner inclined circumferential portion 35; and one inner curved recessed circumferential portion 42 that is circumferentially provided between the inner curved protruding circumferential portions 41, 41. These two inner curved protruding circumferential portions 41, 41 are formed to protrude toward the surface side into a curved shape, while the one inner curved recessed circumferential portion 42 is formed to be recessed toward the back side into a curved shape.

In addition, the hat inner inclined circumferential portion 35 of the hat portion 24 includes a hat top inner recessed circumferential portion 45 that is formed between the hat top circumferential portion 36 and the radially-outer one of the inner curved protruding circumferential portions 41, 41 and that is circumferentially recessed into a curved shape. The hat top circumferential portion 36, the hat top inner recessed circumferential portion 45, the two inner curved protruding circumferential portions 41, 41, and the inner curved recessed circumferential portion 42 are formed concentrically about the central axis L. The inner curved protruding circumferential portion 41, the inner curved recessed circumferential portion 42, the inner curved protruding circumferential portion 41, and the hat top inner recessed circumferential portion 45 are continuously formed in the described order along the radial direction to form the hat inner inclined circumferential portion 35 into a wave shape.

In contrast, in the construction of Example 1 of the invention, as shown in FIGS. 2 and 3, the hat outer inclined circumferential portion 37 of the hat portion 24 includes: two outer curved protruding circumferential portions 51, 51 that are circumferentially provided on an intermediate portion of the hat outer inclined circumferential portion 37; and one outer curved recessed circumferential portion 52 that is circumferentially provided between the outer curved protruding circumferential portions 51, 51. These two outer curved protruding circumferential portions 51, 51 are formed to protrude toward the surface side into a curved shape, while the one outer curved recessed circumferential portion 52 is formed to be recessed toward the back side into a curved shape. In addition, the hat outer inclined circumferential portion 37 includes a hat top outer recessed circumferential portion 55 that is formed between the hat top circumferential portion 36 and the radially-inner one of the outer curved protruding circumferential portions 51, 51 and that is circumferentially recessed into a curved shape. The hat top circumferential portion 36, the hat top outer recessed circumferential portion 55, the two outer curved protruding circumferential portions 51, 51, and the outer curved recessed circumferential portion 52 are formed concentrically about the central axis L. The outer curved protruding circumferential portion 51, the outer curved recessed circumferential portion 52, the outer curved protruding circumferential portion 51, and the hat top outer recessed circumferential portion 55 are continuously formed in the described order along the radial direction to form the hat outer inclined circumferential portion 37 into a wave shape.

The hat inner inclined circumferential portion 35 and the hat outer inclined circumferential portion 37 have respective predetermined shapes and dimensions such that they do not come into contact with the brake caliper 105 when the automobile wheel 1 is connected to the axle 101. More specifically, the inner curved protruding circumferential portions 41, 41 and the outer curved protruding circumferential portions 51, 51 are formed at respective positions in the radial direction to be opposed to the surface-side angular edges 105a to 105d of the brake caliper 105. In addition, respective shapes and dimensions of the inner curved protruding circumferential portions 41, 41 and the outer curved protruding circumferential portions 51, 51 are determined such that they are close to the respectively-opposed surface-side angular edges 105a to 105d of the brake caliper 105. In addition, respective shapes and dimensions of the inner curved recessed circumferential portion 42 and the outer curved recessed circumferential portion 52 are determined such that they are close to the brake caliper 105. This allows a gap between the brake caliper 105, and the hat inner inclined circumferential portion 35 and the hat outer inclined circumferential portion 37 to be formed as small as possible. Accordingly, the hat portion 24 has a smaller radial length that extends along the recessed and protruding shape of the hat inner inclined circumferential portion 35 and the hat outer inclined circumferential portion 37, and consequently the automobile wheel 1 has a reduced overall weight.

As described above, the hat inner inclined circumferential portion 35 and the hat outer inclined circumferential portion 37 are formed into a wavy shape including a plurality of the continuous recesses and protrusions in the radial direction. Because of this shape, the wheel disk 3 has improved stiffness and strength. This allows the car on which the automobile wheel 1 is mounted to provide improved driving stability. In addition, as the stiffness and strength improve, the plate thickness is reduced to reduce the weight of the automobile wheel 1.

In Example 1 of the invention, the inner curved protruding circumferential portions 41, 41 and the outer curved protruding circumferential portions 51, 51 have respective predetermined curved shapes and dimensions based on a radius of curvature that is the same as the radius of curvature of the hat top circumferential portion 36. In addition, the inner curved recessed circumferential portion 42, the outer curved recessed circumferential portion 52, the hat top inner recessed circumferential portion 45, and the hat top outer recessed circumferential portion 55 have respective predetermined curved shapes and dimensions based on the same radius of curvature. As described above, the respective curved shapes and dimensions are determined based on the radius of curvature. This allows the entire hat portion 24 to provide the effect in improving stiffness and strength in a stable manner.

In Example 1 of the invention, the inner curved protruding circumferential portions 41, 41 and the outer curved protruding circumferential portions 51, 51 constitute a curved protruding circumferential portion of the invention. In addition, the inner curved recessed circumferential portion 42 and the outer curved recessed circumferential portion 52 constitute a curved recessed circumferential portion of the invention.

Example 2

Figure 4:
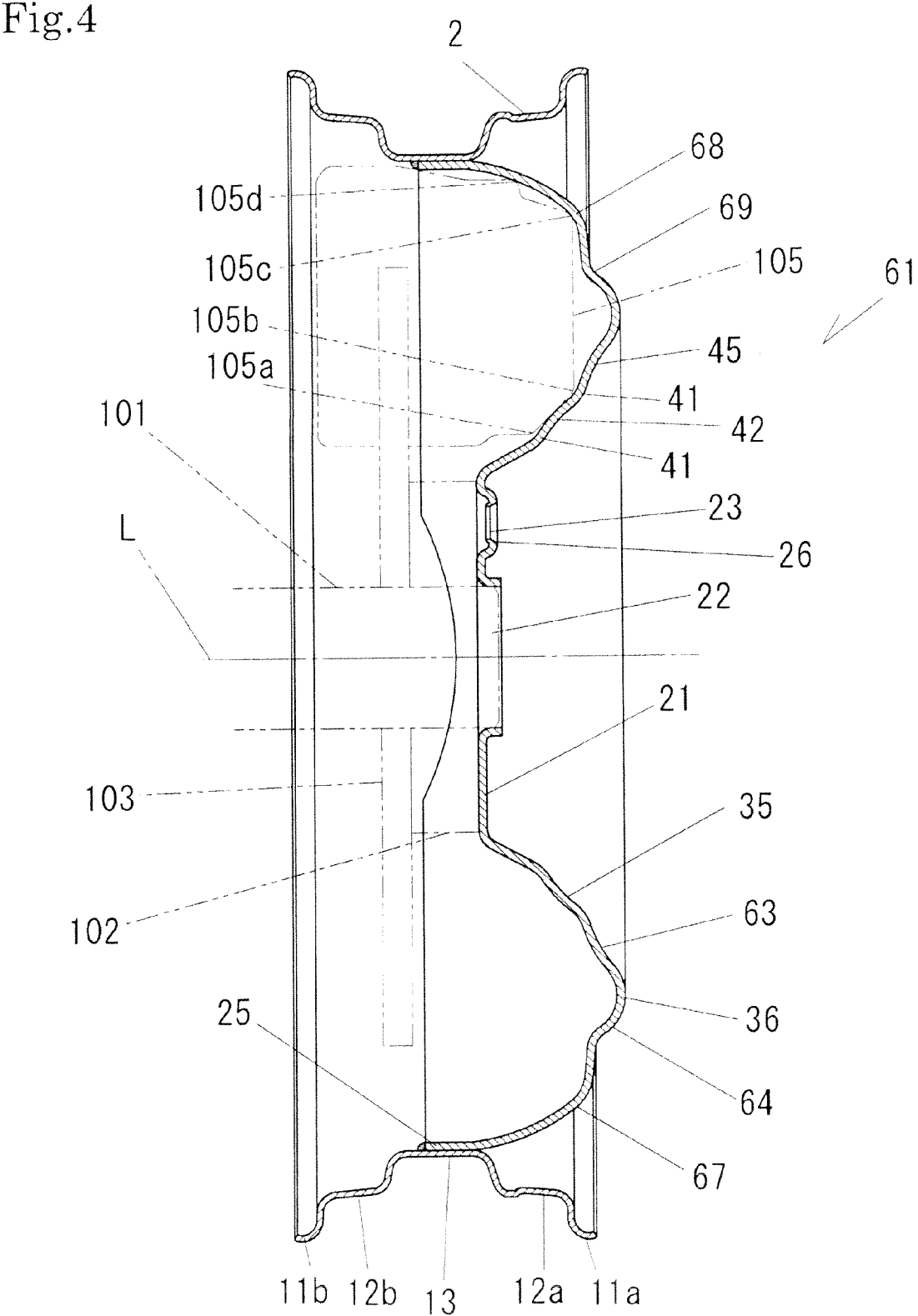
FIG. 4 is a vertical cross-sectional view of an automobile wheel 61 of Example 2 of the present invention.

An automobile wheel 61 of Example 2 of the invention has a construction, as shown in FIG. 4, in which a hat portion 64 of a wheel disk 63 includes: the hat inner inclined circumferential portion 35 that is formed into the a wave shape, similarly to the construction of Example 1 of the invention; and a hat outer inclined circumferential portion 67 that is not formed into a wave shape. That is, the construction of Example 2 of the invention, in which the two inner curved protruding circumferential portions 41, 41 and the one inner curved recessed circumferential portion 42 are provided only on the hat inner inclined circumferential portion 35 of the hat portion 64 of the wheel disk 63, is the same as the construction of Example 1, except the hat outer inclined circumferential portion 67 of the hat portion 64. Thus, the same constituent elements as those described in Example 1 are denoted by the same reference numerals, and therefore are not described any further.

The hat outer inclined circumferential portion 67 of the hat portion 64 includes: an intermediate portion or a curved outer protruding circumferential portion 68 that is circumferentially formed into a curved shape toward the surface side; and a hat top outer recessed circumferential portion 69 that is recessed toward the back side. The outer protruding circumferential portion 68 and the hat top circumferential portion 36 are continuously formed through the hat top outer recessed circumferential portion 69. The outer protruding circumferential portion 68, the hat top outer recessed circumferential portion 69, and the hat top circumferential portion 36 are formed concentrically about the central axis L.

In Example 2 of the invention, a shape and dimensions of the hat outer inclined circumferential portion 67 are determined such that the hat outer inclined circumferential portion 67 does not come into contact with the brake caliper 105 and has a small gap as possible between the brake caliper 105 and the hat outer inclined circumferential portion 67 when the automobile wheel 61 is connected to the axle 101.

In the construction of Example 2 of the invention, the hat portion 64 includes the hat inner inclined circumferential portion 35 that is formed into a wave shape, similarly to the construction of Example 1. Therefore, the hat portion 64 has a smaller radial length that extends along the recessed and protruding shape of the hat inner inclined circumferential portion 35, and consequently the automobile wheel 61 has a reduced overall weight. Because of the shape of the hat inner inclined circumferential portion 35, the wheel disk 63 has improved stiffness and strength. Accordingly, a car on which the automobile wheel 61 is mounted provides improved driving stability.

Example 3

Figure 5:
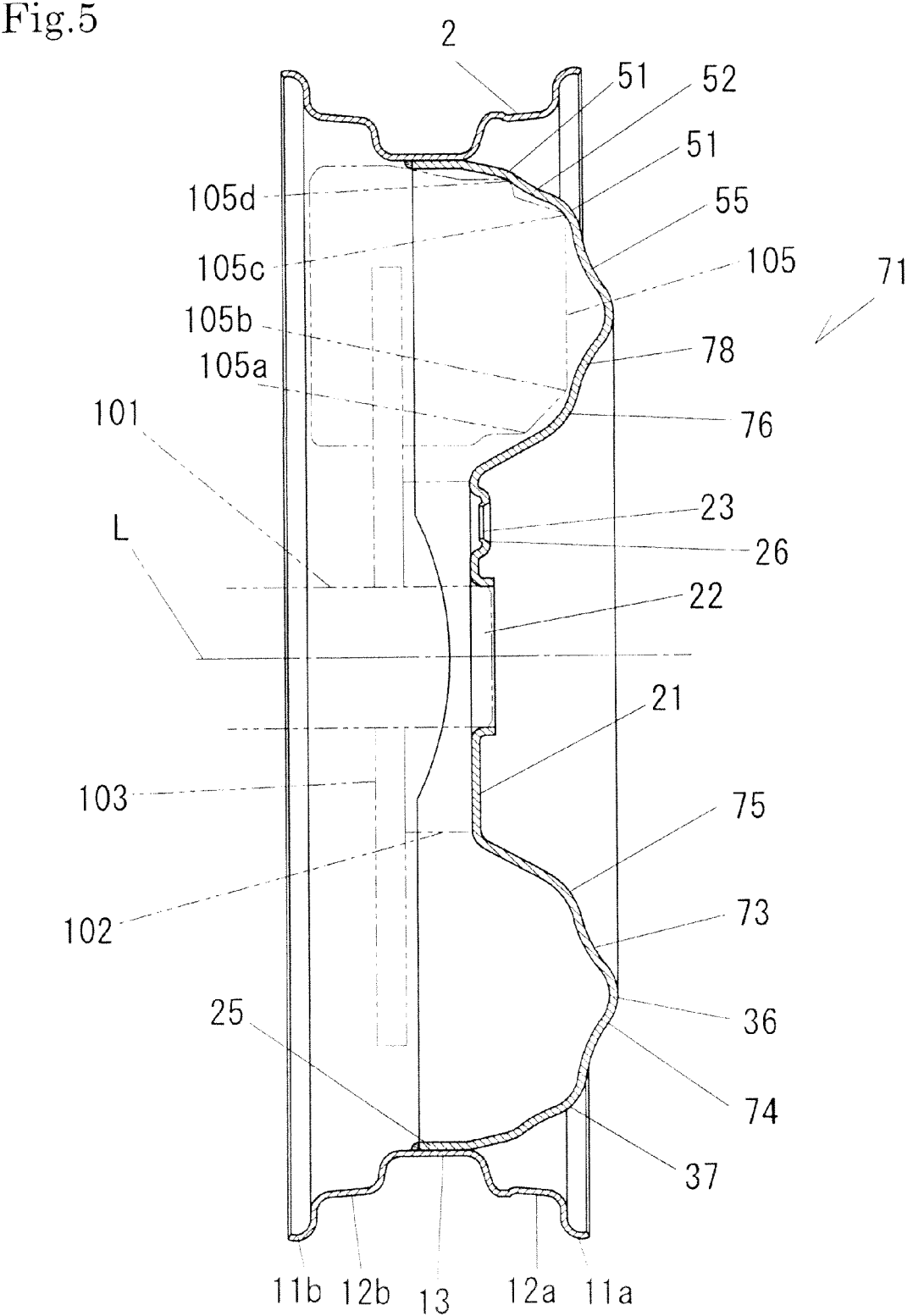
FIG. 5 is a vertical cross-sectional view of an automobile wheel 71 of Example 3 of the present invention.

An automobile wheel 71 of Example 3 of the invention has a construction, as shown in FIG. 5, in which a hat portion 74 of a wheel disk 73 includes: the hat outer inclined circumferential portion 37 that is formed into a wave shape, similarly to the construction of Example 1 of the invention; and a hat inner inclined circumferential portion 75 on which one inner protruding circumferential portion 76 is provided. That is, the construction of Example 3 of the invention, in which two outer curved protruding circumferential portions 51, 51 and one outer curved recessed circumferential portion 52 are provided only on the hat outer inclined circumferential portion 37 of the hat portion 74 of the wheel disk 73, is the same as the construction of Example 1, except the hat inner inclined circumferential portion 75 of the hat portion 74. Thus, the same constituent elements as those described in Example 1 are denoted by the same reference numerals, and therefore are not described any further.

The hat inner inclined circumferential portion 75 of the hat portion 74 includes: the inner protruding circumferential portion 76; and a hat top-inner recessed circumferential portion 78. The inner protruding circumferential portion 76 is formed on an intermediate portion of the hat inner inclined circumferential portion 75 and circumferentially protrudes toward the surface side. The hat top inner recessed circumferential portion 78 is recessed toward the back side into a curved shape. The hat inner inclined circumferential portion 75 is continuously formed with the hat top circumferential portion 36 through the hat top inner recessed circumferential portion 78. The inner protruding circumferential portion 76, the hat top inner recessed circumferential portion 78, and the hat top circumferential portion 36 are formed concentrically about the central axis L.

In Example 3 of the invention, a shape and dimensions of the hat inner inclined circumferential portion 75 are determined such that the hat inner inclined circumferential portion 75 does not come into contact with the brake caliper 105 and has a small gap as possible between the brake caliper 105 and the hat inner inclined circumferential portion 75 when the automobile wheel 71 is connected to the axle 101. Because the hat inner inclined circumferential portion 75 includes only the one inner protruding circumferential portion 76, the inner protruding circumferential portion 76 is formed at a position in the radial direction not to be opposed to the surface-side angular edges 105a and 105b of the brake caliper 105.

In the construction of Example 3 of the invention, the hat portion 74 includes the hat outer inclined circumferential portion 37 that is formed into a wave shape, similarly to the construction of Example 1. Therefore, the hat portion 74 has a smaller radial length that extends along the recessed and protruding shape of the hat outer inclined circumferential portion 37, and consequently the automobile wheel 71 has a reduced overall weight. Because of the shape of the hat outer inclined circumferential portion 37, the wheel disk 73 has improved stiffness and strength. Accordingly, a car on which the automobile wheel 71 is mounted provides improved driving stability.

Simulation calculation was performed for the constructions of Examples 1 to 3 of the invention according to a rotary bending fatigue test (JIS D4103). The results of the simulation calculation are now described.

Figure 8:
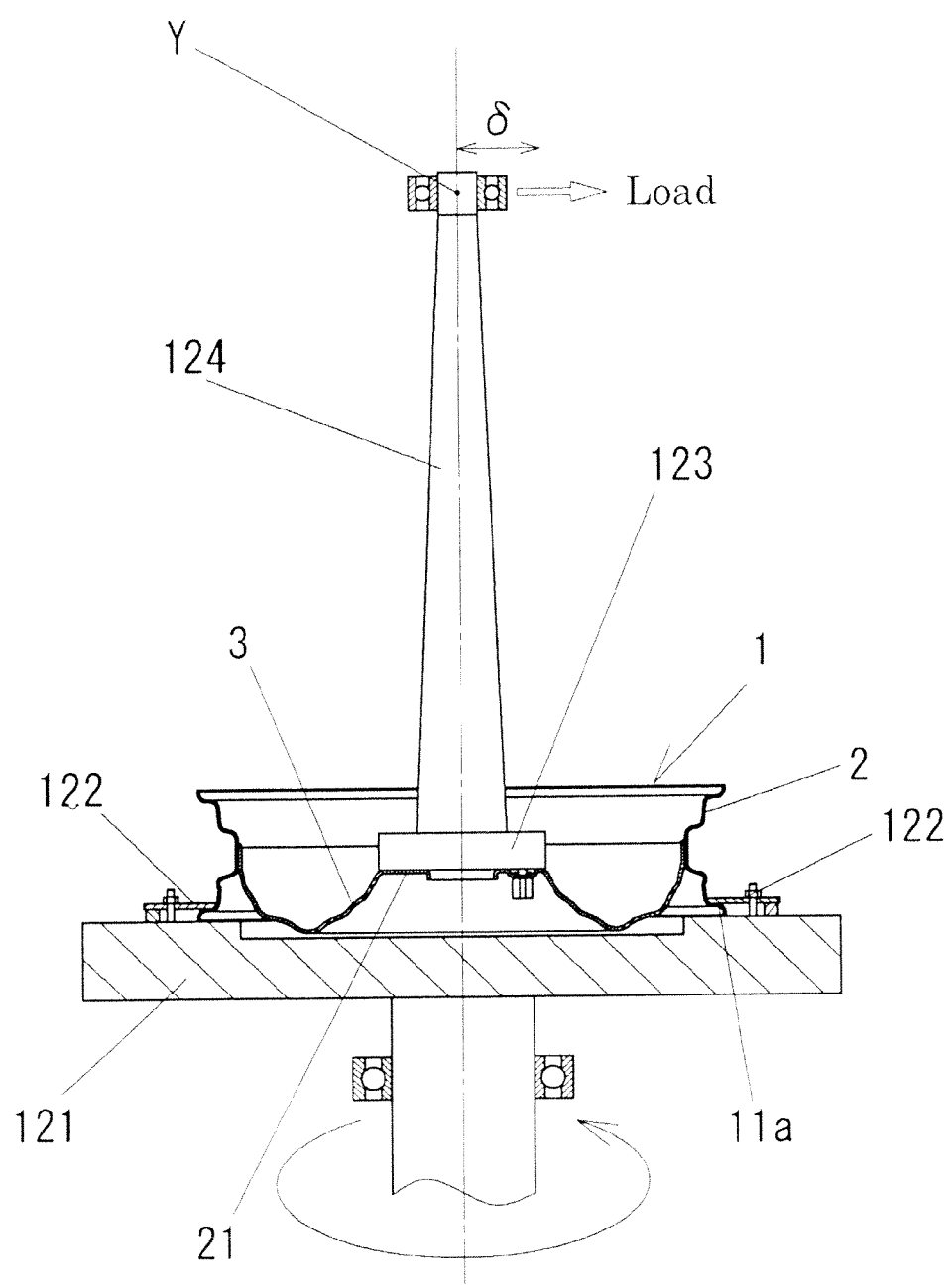
FIG. 8 illustrates how to measure displacement δ in the rotary bending fatigue test.

In the rotary bending fatigue test according to JIS D4103, while an automobile wheel is rotating at a constant speed, a constant bending moment is applied to a hub mounting portion of this rotating automobile wheel. To be more specific, by using the construction of Example 1 of the invention, the surface-side rim flange 11a of the automobile wheel 1 is secured to an upper surface of a rotary disk 121 with a fastener 122, as shown in FIG. 8. A mounting disk 123 is provided at one end of a load arm 124 and is connected to the hub mounting portion 21 from the back side of the automobile wheel 1, so that the load arm 124 is mounted to the automobile wheel 1. After the automobile wheel 1 is set in this manner, a horizontal load is applied to the other end of the load arm 124. While a bending moment is applied to the wheel disk 3, the rotary disk 121 is rotated at a constant speed. Horizontal displacement (deformation) δ of a pivot point Y (a position where a load is applied to provide a bending moment) at the other end of the load arm 124 is measured. The horizontal displacement (δ) occurs mainly according to the stiffness of the wheel disk 3. Therefore, a measurement of the horizontal displacement (δ) is an indicator to evaluate the stiffness of the wheel disk 3 (i.e. the stiffness of the automobile wheel 1).

Figure 6:
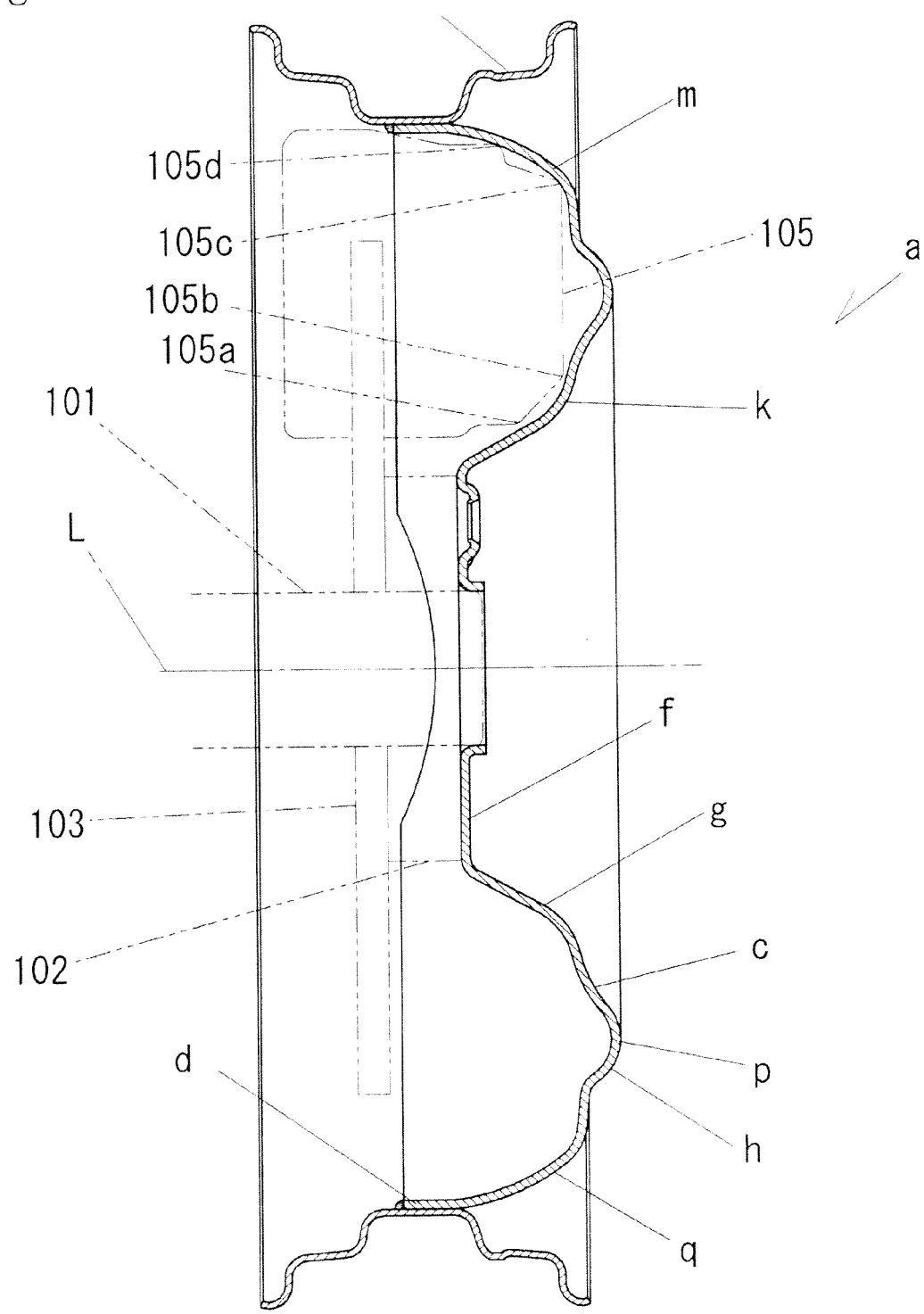

This rotary bending fatigue test was performed for each of the automobile wheels 1, 61, and 71 of Examples 1 to 3 of the invention to calculate the displacement δ of the pivot point Y by simulation calculation based on an FEM analysis. For the comparison purposes simulation calculation on as also performed for the conventional automobile wheel (see FIG. 6) in the same manner as described above.

The automobile wheels 1, 61, and 71 of Examples 1 to 3 of the invention, and the conventional automobile wheel a, each of which has a wheel size of 18×4T (18 inch rim diameter and 4 inch rim width), were used. Each of the wheel rims has a thickness of approximately 2.3 mm and each of the wheel disks has a thickness of approximately 3.5 mm. Each of the hat top circumferential portions of the hat portions has a radius of curvature of 20 mm. In the constructions of Examples 1 to 3 of the invention, the inner curved protruding circumferential portions 41, 41 of the hat inner inclined circumferential portion 35 and the outer curved protruding circumferential portions 51, 51 of the hat outer inclined circumferential portion 37 have a predetermined radius of curvature of 20 mm, while the inner curved recessed circumferential portion 42 and the outer curved recessed circumferential portion 52 have a predetermined radius of curvature of 50 mm.

FIG. 7 shows the results of the simulation calculation according to the rotary bending fatigue test. In the simulation calculation, a constant bending moment of approximately 3 kN·m is applied to calculate the displacement δ of the pivot point Y. The results of the simulation calculation are shown as values that are determined in proportion to the value "1" of the displacement δ in the conventional construction. The weight of each of the wheel disks in the constructions of Examples 1 to 3 and the conventional construction is calculated based on the radial length of the wheel disk, which extends along its recessed and protruding shape. The calculated weight of each of the wheel disks is also shown as a value that is determined in proportion to the value "1" of the weight of the wheel disk in the conventional construction. Because there is a demand for stiffer (stronger) and lighter automobile wheels, the product of the displacement (δ) and the weight is represented as an indicator to determine the effectiveness of improvement in stiffness and weight reduction.

The results of the simulation calculation according to the rotary bending fatigue test show that the displacement δ of the pivot point Y in the constructions of Examples 1 to 3 is smaller than the displacement δ in the conventional construction. That is, in the constructions of Examples 1 to 3, the wheel disks 3, 63, and 73 have higher stiffness than the conventional wheel disk c, and particularly in the construction of Example 1, the smallest displacement δ is obtained. Thus, it is apparent that the construction of Example 1, in which the hat inner inclined circumferential portion 35 includes the curved protruding circumferential portions 41, 41 and the curved recessed circumferential portion 42, while the hat outer inclined circumferential portion 37 includes the curved protruding circumferential portions 51, 51 and the curved recessed circumferential portion 52, produces a more significant effect in improving stiffness of the wheel disk. In addition, it is apparent that the constructions of Examples 2 to 3, in which at least one of the hat inner inclined circumferential portion 35 and the hat outer inclined circumferential portion 37 includes the curved protruding circumferential portions 41, 41 and the curved recessed circumferential portion 42 or the curved protruding circumferential portions 51, 51 and the curved recessed circumferential portion 52, obtain the effect in improving stiffness of the wheel disk. Further, the construction of Example 2, in which the hat inner inclined circumferential portion 35 includes the inner curved protruding circumferential portions 41, 41 and the inner curved recessed circumferential portion 42, is more effective in improving stiffness of the wheel disk than the construction of Example 3, in which the hat outer inclined circumferential portion 37 includes the outer curved protruding circumferential portions 51, 51 and the outer curved recessed circumferential portion 52. Thus, the construction in which the hat inner inclined circumferential portion includes a plurality of curved protruding circumferential portions and at least one curved recessed circumferential portion may be used more preferably.

Furthermore, the results of the weight calculation clearly show that the wheel disks in the constructions of Examples 1 to 3 are lighter than the wheel disk in the conventional construction. This is because the curved protruding circumferential portions are provided at respective positions in the radial direction to be opposed to the surface-side angular edges of the brake caliper and the curved recessed circumferential portion is provided to have a small gap as possible between the brake caliper and the curved recessed circumferential portion. Thus, it is understood that the constructions of Examples 1 to 3 are more effective in reducing the weight than the conventional construction. In addition, in the constructions of Examples 1 to 3, values of the product of the displacement δ and the weight are smaller than the value in the conventional construction. Particularly, in the construction of Example 1, the smallest value of the product of the displacement and the weight is obtained, and accordingly the best balance between the stiffness and the weight reduction is obtained.

The simulation calculation according to the rotary bending fatigue test was performed for the automobile wheels with the above wheel size. However, even when a wheel size different from the above wheel size is employed, the automobile wheels of Examples 1 to 3 can also have higher stiffness and strength and a greater effect in reducing the weight than the conventional automobile wheel.

In the constructions of Examples 1 to 3 of the invention, at least one of the hat inner inclined circumferential portion and the hat outer inclined circumferential portion includes two curved protruding circumferential portions and one curved recessed circumferential portion. However, in an alternative construction, the number of curved protruding circumferential portions and the number of curved recessed circumferential portions may be changed as appropriate. For example, at least one of the hat inner inclined circumferential portion and the hat outer inclined circumferential portion may include three curved protruding circumferential portions and two curved recessed circumferential portions, or may include four curved protruding circumferential portions and three curved recessed circumferential portions. In addition, the hat inner inclined circumferential portion and the hat outer inclined circumferential portion may include a different number of curved protruding circumferential portions and a different number of curved recessed circumferential portions from each other. For example, the hat inner inclined circumferential portion may include three curved protruding circumferential portions and two curved recessed circumferential portions, while the hat outer inclined circumferential portion may include two curved protruding circumferential portions and one curved recessed circumferential portion. Reversely, the hat inner inclined circumferential portion may include two curved protruding circumferential portions and one curved recessed circumferential portion, while the hat outer inclined circumferential portion may include three curved protruding circumferential portions and two curved recessed circumferential portions. The results of the simulation calculation show that the construction in which the hat inner inclined circumferential portion includes the curved protruding circumferential portions and the curved recessed circumferential portion obtains a more significant effect in improving stiffness. Therefore, preferably the hat inner inclined circumferential portion includes a larger number of curved protruding circumferential portions and a larger number of curved recessed circumferential portions than the hat outer inclined circumferential portion.

In the constructions of Examples 1 to 3 of the invention, the curved protruding circumferential portions (the inner curved protruding circumferential portion and the outer curved protruding circumferential portion) have the same predetermined radius of curvature. However, they may also have different predetermined radii of curvature from each other. The same applies to the radius of curvature of the curved recessed circumferential portions. In addition, the curved protruding circumferential portions may have a radius of curvature larger than or the same as the radius of curvature of the curved recessed circumferential portions.

In the constructions of Examples 1 to 3 of the invention, no decorative hole is formed on the wheel disk. However, a plurality of decorative holes may be formed on the outer inclined circumferential portion of the hat portion. For example, preferably a plurality of decorative holes may be provided at equal intervals in the circumferential direction at a location outside of the radially-outer curved protruding circumferential portion on the outer inclined circumferential portion.

The present invention is not limited to the above examples, and changes and modifications may be made to the constructions described in the examples within the scope of the invention. For example, an automobile wheel that is formed from aluminum alloy, magnesium alloy, titanium alloy or fiber reinforced metal (FRM) and that has the same construction as described in the above examples can also provide the same functional effect.

The invention claimed is:

1. An automobile wheel comprising: a wheel disk; and a substantially cylindrical wheel rim on which a tire is mounted, in which the wheel disk includes: a substantially disk-shaped hub mounting portion that is connected to a hub of an axle; a hat portion that bulges outward from the hub mounting portion toward a surface side direction; and a disk flange that extends from an outer circumferential edge of the hat portion toward a back side direction, and the wheel disk is engaged with an inner circumferential surface of the wheel rim to join the wheel disk and the wheel rim together, wherein
   the hat portion includes: a hat top circumferential portion that circumferentially protrudes toward the surface side direction into a curved shape; a hat inner inclined circumferential portion that is formed continuously from the hat top circumferential portion to an outer circumferential edge of the hub mounting portion; and a hat outer inclined circumferential portion that is formed continuously from the hat top circumferential portion to the disk flange, and at least one of the hat inner inclined circumferential portion and the hat outer inclined circumferential portion is formed circumferentially with:
   a plurality of curved protruding circumferential portions that circumferentially protrude toward a surface side into a curved shape; and at least one curved recessed circumferential portion that is provided between the adjacent curved protruding circumferential portions and that is circumferentially recessed toward a back side into a curved shape, the curved protruding circumferential portions and the curved recessed circumferential portion being arranged concentrically, wherein
   the curved protruding circumferential portions that are provided on at least one of the hat inner inclined circumferential portion and the hat outer inclined circumferential portion of the hat portion are formed circumferentially at respective positions in a radial direction to be opposed to surface-side angular edges of a brake caliper mounted to a body, and
   each of the hat inner inclined circumferential portion and the hat outer inclined circumferential portion of the hat portion is formed circumferentially with: the plurality of the curved protruding circumferential portions; and the at least one curved recessed circumferential portion, the curved protruding circumferential portions and the curved recessed circumferential portion being arranged concentrically.

2. An automobile wheel comprising: a wheel disk; and a substantially cylindrical wheel rim on which a tire is mounted, in which the wheel disk includes: a substantially disk-shaped hub mounting portion that is connected to a hub of an axle; a hat portion that bulges outward from the hub mounting portion toward a surface side direction; and a disk flange that extends from an outer circumferential edge of the hat portion toward a back side direction, and the wheel disk is engaged with an inner circumferential surface of the wheel rim to join the wheel disk and the wheel rim together, wherein
   the hat portion includes: a hat top circumferential portion that circumferentially protrudes toward the surface side direction into a curved shape: a hat inner inclined circumferential portion that is formed continuously from the hat top circumferential portion to an outer circumferential edge of the hub mounting portion; and a hat outer inclined circumferential portion that is formed continuously from the hat top circumferential portion to the disk flange, and at least one of the hat inner inclined circumferential portion and the hat outer inclined circumferential portion is formed circumferentially with:
   a plurality of curved protruding circumferential portions that circumferentially protrude toward a surface side into a curved shape; and at least one curved recessed circumferential portion that is provided between the adjacent curved protruding circumferential portions and that is circumferentially recessed toward a back side into a curved shape, the curved protruding circumferential portions and the curved recessed circumferential portion being arranged concentrically, wherein
   each of the hat inner inclined circumferential portion and the hat outer inclined circumferential portion of the hat portion is formed circumferentially with: the plurality of the curved protruding circumferential portions; and the at least one curved recessed circumferential portion, the curved protruding circumferential portions and the curved recessed circumferential portion being arranged concentrically.

* * * * *